E. A. LARSON.
BRACKET.
APPLICATION FILED SEPT. 21, 1914.

1,246,119. Patented Nov. 13, 1917.

Witnesses:

Inventor:
Edward A. Larson
by Burton & Burton
his attys.

UNITED STATES PATENT OFFICE.

EDWARD A. LARSON, OF CHICAGO, ILLINOIS, ASSIGNOR TO STEWART-WARNER SPEEDOMETER CORPORATION, OF CHICAGO, ILLINOIS, A CORPORATION OF VIRGINIA.

BRACKET.

1,246,119.  Specification of Letters Patent.  Patented Nov. 13, 1917.

Application filed September 21, 1914. Serial No. 862,854.

*To all whom it may concern:*

Be it known that I, EDWARD A. LARSON, a citizen of the United States, residing at Chicago, in the county of Cook and State of Illinois, have invented new and useful Improvements in Brackets, of which the following is a specification, reference being had to the accompanying drawings, forming a part thereof.

This invention relates to an improved form of bracket for supporting an alarm device in position upon the body of a vehicle. It consists of the features and elements described and shown in the drawings as indicated by the claims.

Figure 1:
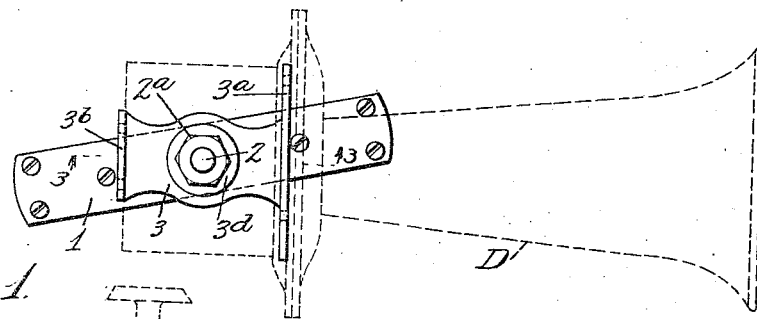
Figure 1 is a top plan view of the bracket embodying this invention, showing in dotted outline an alarm device supported thereby.
Figure 2:
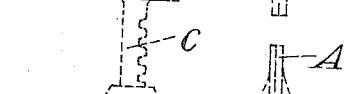
Fig. 2 is a side elevation of the bracket showing the alarm device in dotted outline.
Figure 3:
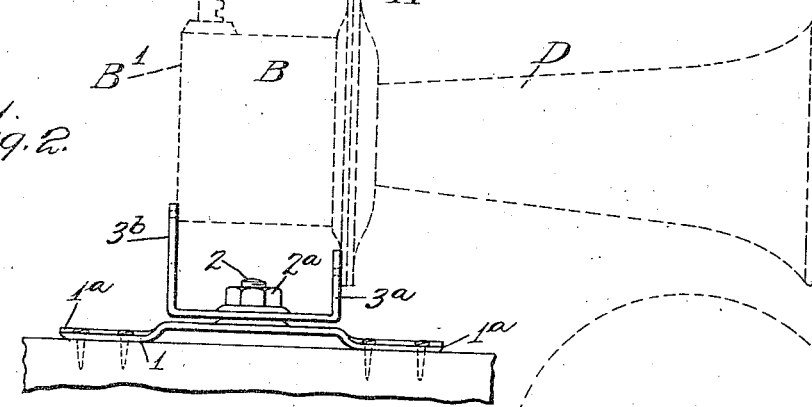
Fig. 3 is a detail section taken as indicated at the line, 3—3, on Fig. 1.
Figure 4:
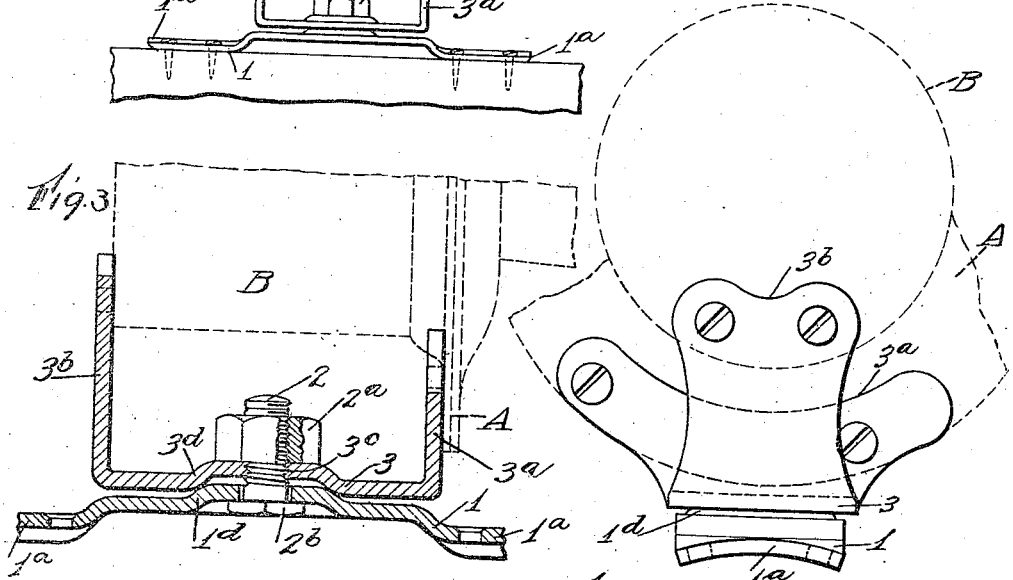
Fig. 4 is a rear elevation of the bracket.

The alarm device for which this bracket is particularly designed consists essentially of an acoustic diaphragm supported in a frame, A, mechanism for vibrating the diaphragm housed in a casing, B, and arranged for manual operation, as by a vertically movable plunger, C. Usually a projecting resonator or horn, D, is also provided. This type of alarm is used principally upon automobiles and should be mounted upon the body of the vehicle, within convenient reach of the driver. It is usually supported upon the side panel or door of the body just ahead of the arm of the driver's seat, and the bracket which is the subject of this invention is formed with an upwardly-rounded mounting base, 1, designed to conform to the usual rounded molding on the edge of the body panel or door of the vehicle. Each end of the mounting member, 1, is thus formed at 1ª, while its middle portion is slightly upraised to provide clearance for the head of the pivot screw, 2, by which the bracket member, 3, is connected to the mounting member, 1. This bracket member, 3, is roughly U-shaped, having a vertically-extending portion, 3ª, formed for attachment to the diaphragm frame, A, and another vertically extending portion, 3ᵇ, arranged to be secured to the back of the casing, B. Since the actuating plunger, C, is positioned ahead of the rear wall, B¹, of the casing, B, the line of actuating thrust of the plunger, C, comes between the two supports, 3ª and 3ᵇ, and does not tend to distort or bend the supporting bracket.

In practically all the present styles of automobile bodies, the side panel or door upon which the alarm device would naturally be mounted, does not trend exactly in the direction of travel,—that is, parallel to the longitudinal axis of the vehicle,—but usually bends forward and inward to effect a narrowing of the body outline at the dashboard. By reason of the pivotal connection between the mounting member, 1, and the bracket member, 3, it becomes possible to aline the horn, D, to project the sound straight ahead in the direction of travel, while permitting the mounting member, 1, to follow the trend of the body outline. Preferably the bracket member, 3, will be formed with a thread at 3ᶜ, fitting the thread of the pivot bolt, 2, so that when the desired angular relation between the parts, 1 and 3, is obtained, they may be secured by tightening up the head, 2ᵇ, of the bolt, 2, and tightening down the nut, 2ª, to act as a jam nut. This will bring circular bosses, 1ᵈ and 3ᵈ, into close frictional engagement sufficient to hold the parts in the adjusted relation.

I claim:—

1. A bracket device comprising a supporting member having a horizontal portion with upturned ends adapted for attachment to a body to be supported, a mounting member perforated for securing screws, one of said members having a circular boss and the other having a circular depression fitted for pivotal engagement with such boss, and a clamp screw extending through both members substantially along the common axis of said circular features for securing the members in adjustment.

2. A bracket member comprising a base and upturned lugs at a distance apart along this base adapted for attachment of the lugs to a body to be supported thereby, a mounting member, and means positioned on the bracket between the lugs for removably securing the bracket member rigidly to said mounting member, said members being relatively formed for bearing of one upon the other between the position of the securing means and the aforesaid lugs, respectively.

3. A bracket for the purpose indicated, comprising a mounting member whose end portions have downwardly-facing bearing surfaces and are perforated to receive attaching means, and whose middle portion is offset above said bearing surfaces, together with a supporting member and a pivotal clamping element extending through apertures in such support and in the offset middle portion of the mounting member respectively, whereby one end of such pivotal element may be accommodated in the space under said offset part.

4. A bracket for the purpose indicated, comprising a mounting member whose end portions have downwardly facing bearing surfaces and are perforated to receive attaching means, and whose middle portion is off-set above said bearing surfaces and provided with a pivot aperture, together with a supporting member and a pivot bolt in the aperture securing said supporting member to the mounting member, the head of said bolt being accommodated in the space under the off-set portion of said mounting member, and a nut engaging the bolt above the supporting member.

5. A bracket for the purpose indicated, comprising a mounting member, and a supporting member pivotally connected, said mounting member being perforated to receive attaching means, and both ends of the supporting member being bent transversely of its middle portion extending away from the mounting member and formed for attachment to the body to be supported, together with clamping means associated with the pivotal connection and accessible between said bent end portions of the supporting member.

In testimony whereof witness my hand at Chicago, Illinois, this 18th day of September, 1914.

EDWARD A. LARSON.

Witnesses:
C. O. SPEELMAN,
J. G. GILMORE.